(12) United States Patent
Tsorng et al.

(10) Patent No.: US 12,123,452 B2
(45) Date of Patent: Oct. 22, 2024

(54) EYE BOLT ASSEMBLIES AND METHODS OF INSTALLING THE SAME

(71) Applicant: Quanta Computer Inc., Taoyuan (TW)

(72) Inventors: Yaw-Tzorng Tsorng, Taoyuan (TW); Ming-Lung Wang, Taoyuan (TW); Hung-Wei Chen, Taoyuan (TW); Yu-Cheng Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 299 days.

(21) Appl. No.: 17/182,645

(22) Filed: Feb. 23, 2021

(65) Prior Publication Data

US 2022/0268309 A1 Aug. 25, 2022

(51) Int. Cl.
*F16B 41/00* (2006.01)
*F16B 45/00* (2006.01)

(52) U.S. Cl.
CPC ............ *F16B 41/002* (2013.01); *F16B 45/00* (2013.01)

(58) Field of Classification Search
CPC ............................... F16B 41/002; F16B 45/00
USPC ..................................................... 403/89, 349
See application file for complete search history.

(56) References Cited

FOREIGN PATENT DOCUMENTS

DE 202017003358 U1 * 10/2017
WO WO-2009132390 A1 * 11/2009 ............... A62B 1/04

OTHER PUBLICATIONS

For (Year: 2017).*

* cited by examiner

*Primary Examiner* — Lindsay M Low
*Assistant Examiner* — Omar Morales
(74) *Attorney, Agent, or Firm* — NIXON PEABODY LLP (57) ABSTRACT

An eye-bolt assembly includes an eye bolt and a base portion. The eye bolt includes a ring portion, a stem portion, and at least one winged extension. The ring portion is attached a first end of the stem portion. The at least one winged extension is attached to a second end of the stem portion. The base portion receives and securely locks the eye bolt therein. The base portion includes a collar and a platform secured to the collar. The collar forms a first aperture therein. The platform forms a second aperture therein. The platform includes a spring being located at least partially within the second aperture. A first end of the spring is attached to the platform. The second aperture formed in the platform is in spaced communication with the first aperture formed in the collar.

15 Claims, 9 Drawing Sheets

EYE BOLT ASSEMBLIES AND METHODS OF INSTALLING THE SAME

FIELD OF THE INVENTION

The present invention relates generally to eye bolt assemblies, and more specifically, to eye bolt assemblies that are fixed to a structure to assist in moving or positioning the structure.

BACKGROUND OF THE INVENTION

Eye bolts are bolts with a loop at one end. The eye bolts are typically used to firmly attach a securing eye to a structure, such that cables or ropes may then be tied to it. These cables and ropes assist in more easily moving the structure. One disadvantage of existing eye bolts is the amount of time needed to install the existing eye bolts into a structure. These time-consuming steps may be exacerbated by the number of eye bolts that need to be installed to a structure to safely lift or move the same.

The present disclosure is directed to an improved eye bolt that overcomes the above disadvantages of existing eye bolts and installation methods of the same.

SUMMARY OF THE INVENTION

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings and each claim.

According to one aspect of the present disclosure, an eye-bolt assembly includes an eye bolt and a base portion. The eye bolt includes a ring portion, a stem portion, and at least one winged extension. The stem portion includes a first end and a second end. The ring portion is attached to the first end of the stem portion. The at least one winged extension is attached to the second end of the stem portion. The base portion is configured to receive and securely lock the eye bolt therein. The base portion includes a collar and a platform secured to the collar. The collar forms a first aperture therein. The platform forms a second aperture therein. The platform includes a spring being located at least partially within the second aperture of the platform. The spring includes a first end and a second end. The first end of the spring is attached to the platform. The second aperture formed in the platform is in spaced communication with the first aperture formed in the collar.

According to a configuration of the above implementation, the ring portion is generally circular shaped.

According to another configuration of the above implementation, the stem portion includes a shoulder and the shoulder is attached to the ring portion. In one embodiment, the shoulder has a top surface and a bottom surface. The shoulder is angled outwardly from the top surface to the bottom surface.

According to a further configuration of the above implementation, the at least one winged extension is a plurality of winged extensions.

In a further aspect of the above implementation, the eye bolt assembly further includes a cover top. The cover top is attached to the second end of the spring.

In a further aspect of the above implementation, the platform includes a cover bottom. The cover bottom is attached to the first end of the spring.

In yet a further aspect of the above implementation, the collar forms an internal shoulder. The internal shoulder assists in locking the eye bolt assembly by receiving the at least winged extension.

In another aspect of the above implementation, the second aperture formed in the platform is generally aligned with the first aperture formed in the collar.

According to a further aspect of the present disclosure, the eye bolt assembly comprises a metallic material. One non-limiting example of a metallic metal is stainless steel. Other examples include aluminum, zinc, titanium, and alloys of the same. For example, the eye bolt assembly may be an aluminum alloy, a zinc alloy, or a titanium alloy.

According to a configuration of the above implementation, the eye bolt assembly comprises a polymeric material. One non-limiting example of a polymeric material is polycarbonates or polyethylene terephthlates (PETs).

According to one method, an eye bolt assembly is assembled and secured to a structure. The eye bolt assembly is provided and includes an eye bolt and a base portion. The eye bolt includes a ring portion, a stem portion, and at least one winged extension. The stem portion includes a first end and a second end. The ring portion is attached to the first end of the stem portion. The at least one winged extension is attached to the second end of the stem portion. The base portion is configured to receive and securely lock the eye bolt therein. The base portion includes a collar and a platform secured to the collar. The collar forms a first aperture therein. The platform forms a second aperture therein. The platform includes a spring being located at least partially within the second aperture of the platform. The spring includes a first end and a second end. The first end of the spring is attached to the platform. The second aperture formed in the platform is in spaced communication with the first aperture formed in the collar. The eye bolt is moved in a generally downwardly direction into the first aperture of the collar, resulting in the spring compressing. After the eye bolt has been moved into the first aperture of the collar and the spring has been compressed, rotating the eye bolt with respect to the base portion, resulting in the spring expanding and moving the eye bolt into a locked position.

According to one implementation of the method, the base portion of the eye bolt assembly is secured to the structure by welding. In another method, the base portion of the eye bolt assembly is secured to the structure by a fastener.

According to a further implementation of the method, the method is performed in the absence of tools.

According to a further implementation of the method, the spring is in the fully compressed position when the eye bolt is rotated with respect to the base portion.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

While the invention is susceptible to various modifications and alternative forms, specific implementations have been shown by way of example in the drawings and will be described in further detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Various embodiments are described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Figure 1:
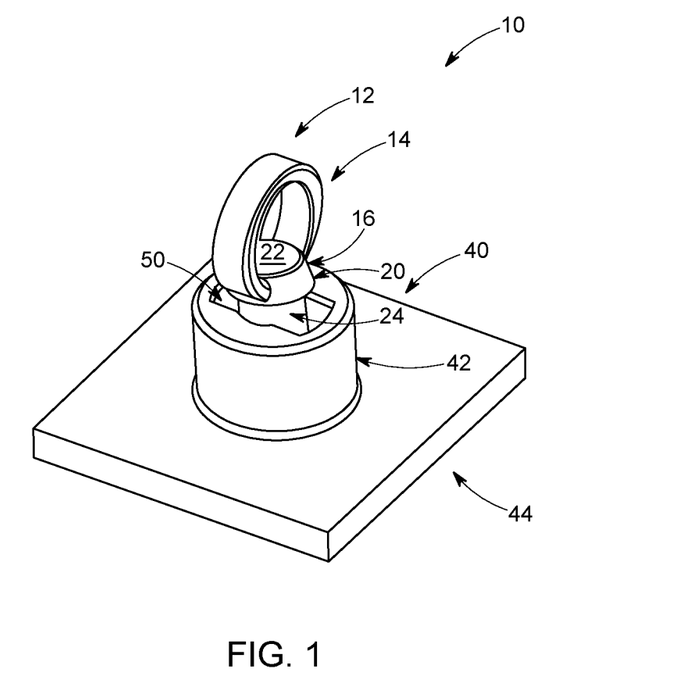
FIG. 1 is a top perspective view of an eye bolt assembly in a locked position, in accordance with one embodiment of the present disclosure.
Figure 2:
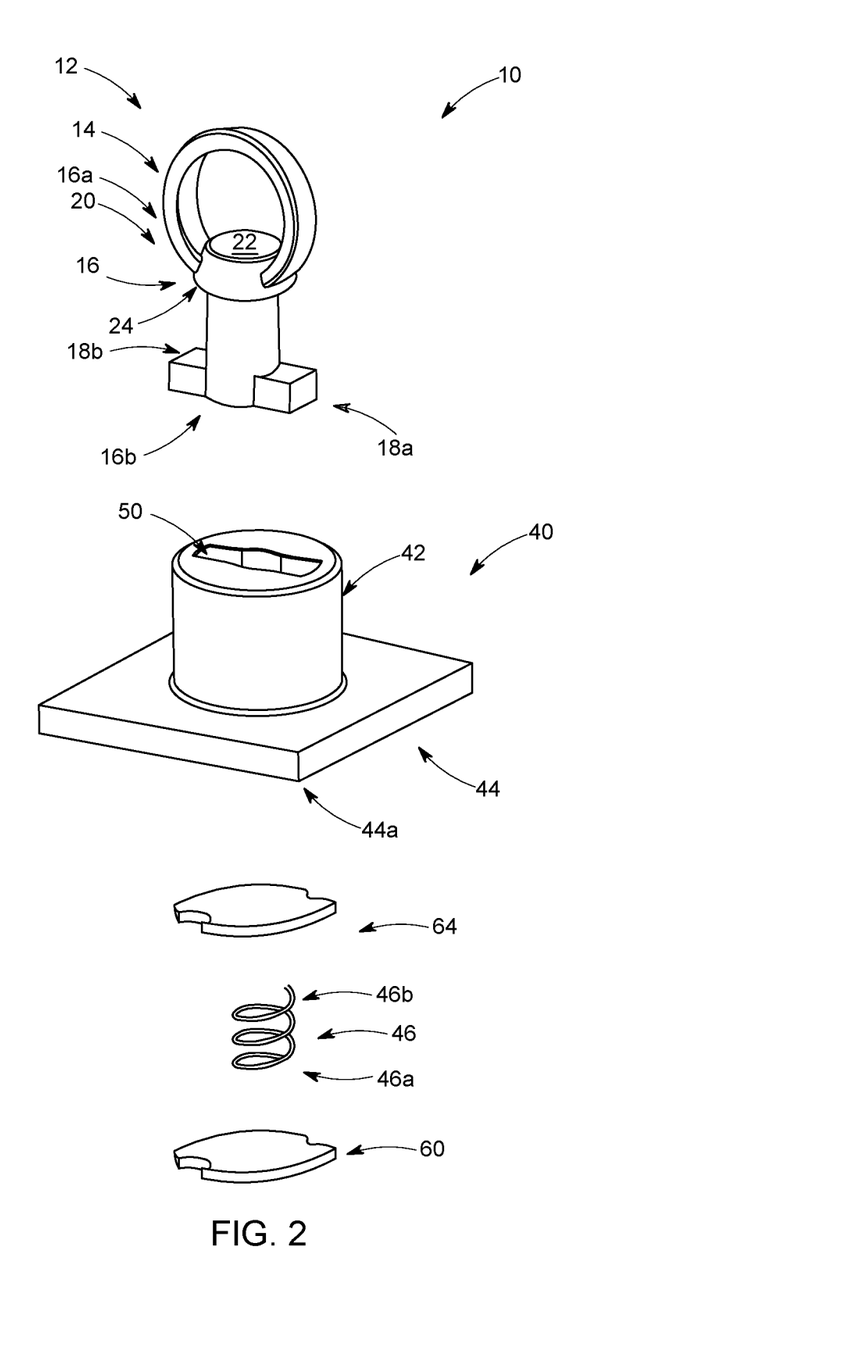
FIG. 2 is an exploded view of the eye bolt assembly of FIG. 1.
Figure 3A:
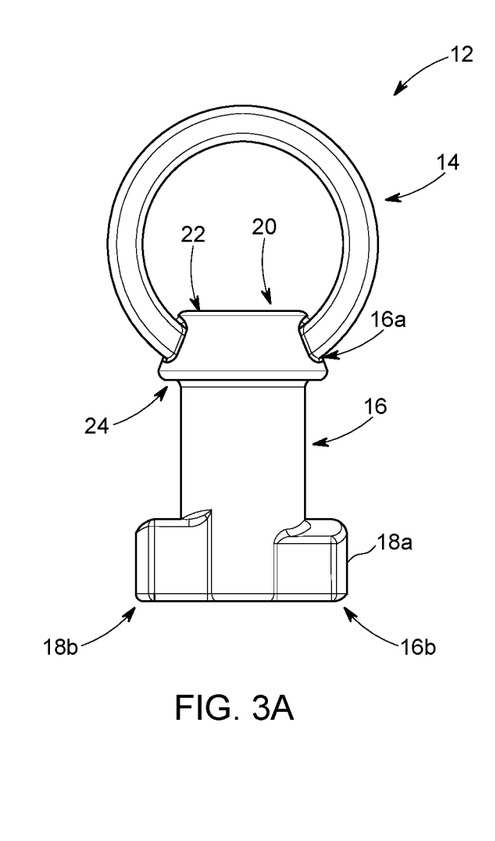
FIG. 3A is a front view of an eye bolt used in the eye bolt assembly of FIG. 1, in accordance with one embodiment of the present disclosure.
Figure 3B:
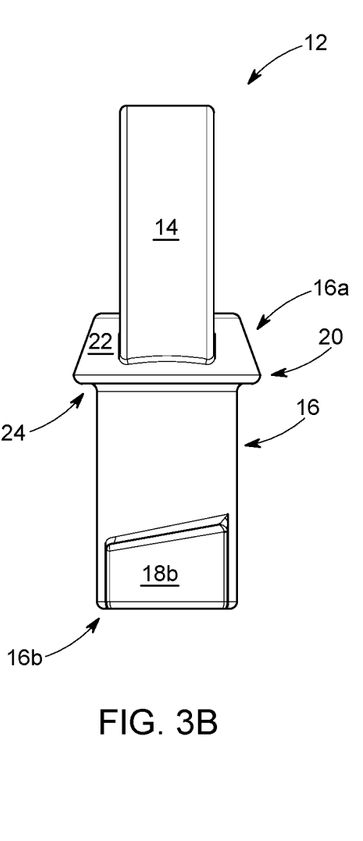
FIG. 3B is a side view of the eye bolt of FIG. 3A.
Figure 3C:
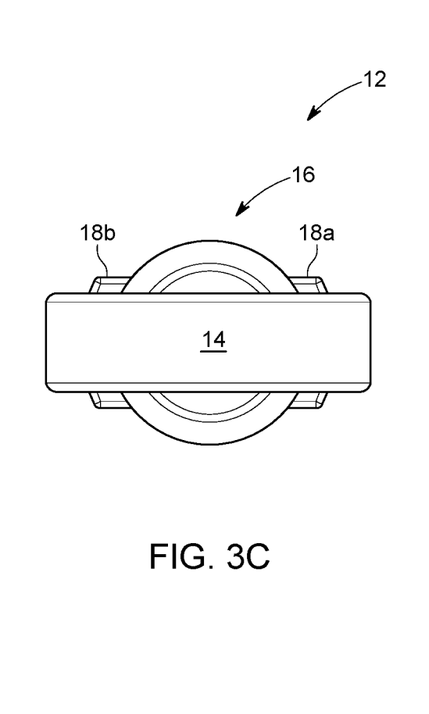
FIG. 3C is a top view of the eye bolt of FIG. 3A.

FIGS. 1 and 2 illustrate an eye bolt assembly 10 that is configured to being secured to a structure. The eye bolt assembly assists in moving the structure during the installation process. The eye bolt assembly may be securely attached to many different types of structures. Some non-limiting examples of structures include, but are not limited to, cabinets, servers, desktops and racks. The eye bolt assemblies, which are secured to the structure, may be used in outdoor and indoor locations.

The eye bolt assembly of the present invention is easy for a user to install and securely fix to a structure. The eye bolt assembly is designed to reduce the time for installation to the structure. The present invention is also advantageous in that it may be assembled in the absence of tools in one method.

FIG. 1 illustrates the eye bolt assembly 10 in an assembled top perspective view in a locked position, and FIG. 2 shows an exploded view of the components in the eye bolt assembly of FIG. 1. Referring to FIGS. 1 and 2, the eye bolt assembly 10 includes an eye bolt 12 and a base portion 40. The eye bolt 12 includes a ring portion 14, a stem portion 16, and a pair of opposing winged extensions 18a, 18b. The base portion 40 includes a collar 42, a platform 44, and a spring 46.

Referring specifically to FIGS. 2 and 3A-3C, the ring portion 14 is attached to the stem portion 16 at a first end 16a. The ring portion 14 is shown as being generally circular shaped. It is contemplated that the ring portion may be of other shapes and sizes, such as oval or a polygonal shape. The ring portion 14 is sized and configured to receive a hook or a ring in one method. The hook or ring is typically attached to a cable or rope in one method to assist in moving and locating a structure.

The stem portion 16 in one embodiment includes a shoulder 20. The shoulder 20 is attached to the ring portion 14 at the first end 16a of the stem portion 16. The shoulder assists in handling structures that are heavier by keeping the ring portion positioned properly. The shoulder 20 of FIGS. 2, 3A and 3B includes a top surface 22 and a bottom surface 24 as best shown in FIG. 2. The shoulder 20 is angled outwardly from the top surface 22 to the bottom surface 24. The shoulder, by being angled, assists in improving the moving and handling of selected structures. It is contemplated that the shoulder may be shaped differently than depicted in FIGS. 1 and 2. It is contemplated in another embodiment that the eye bolt assembly may not include a shoulder.

In some embodiments, the eye bolt assembly may include at least one winged extension. For example, the eye bolt assembly may include one continuous winged extension that surrounds the stem portion at its second end.

The eye bolt assemblies may include a plurality of winged extensions, such as the pair of winged extensions 18a, 18b shown in FIGS. 2 and 3A-3C. The pair of winged extensions 18a, 18b are attached to a second end 16b of the stem portion 16. The pair of winged extensions 18a, 18b extends outwardly from the stem portion 16. The winged extensions 18a, 18b assist in securing the eye bolt assembly 10 in a locked position, as will be discussed below. These pair of winged structures may be shaped differently than depicted in FIGS. 2 and 3A-3C.

The components of the eye bolt assembly may be integrally formed assembly in one embodiment. In another embodiment, the eye bolt assembly may be made of two or more components that are securely attached to each other.

Figure 4A:
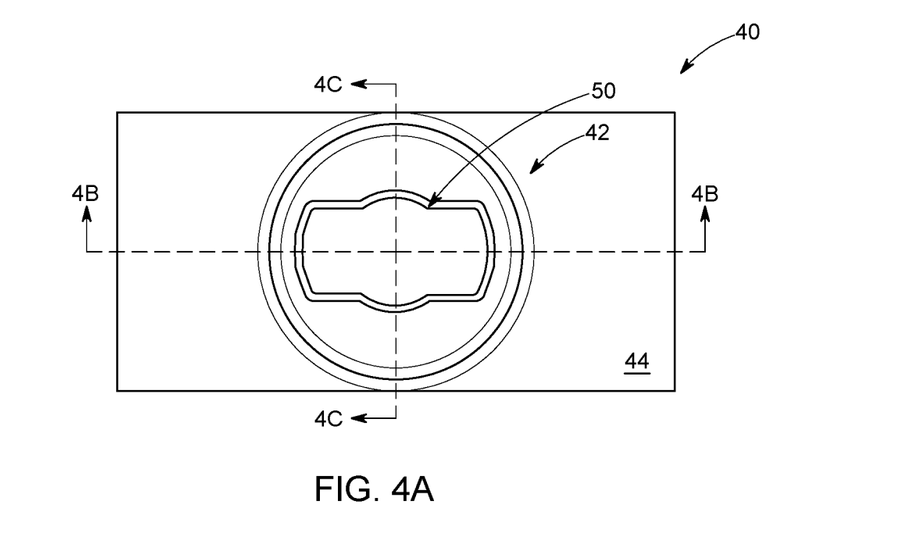
FIG. 4A is a top view of a base portion used in the eye bolt assembly of FIG. 1, in accordance with one embodiment of the present disclosure.
Figure 4B:
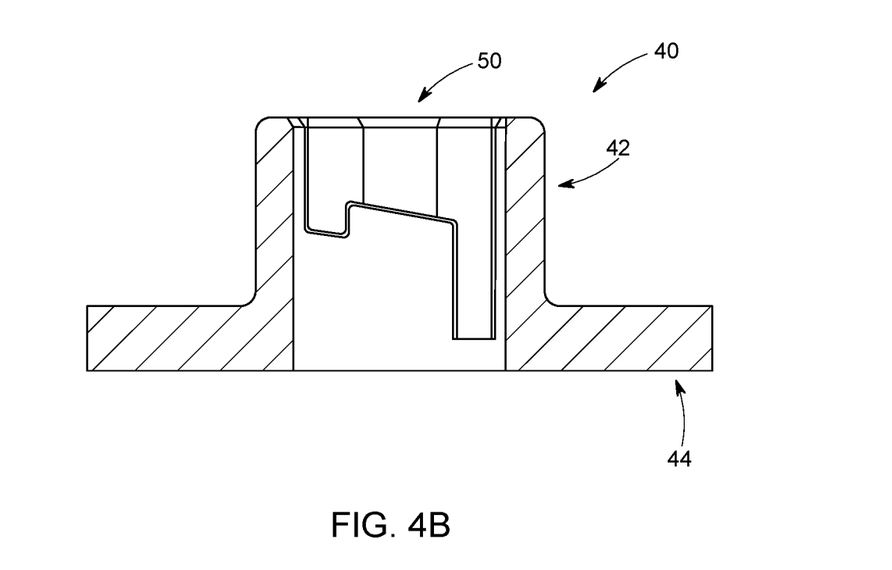
FIG. 4B is a cross-sectional view of the base portion of FIG. 4A taken generally along line 4B-4B in FIG. 4A.
Figure 4C:
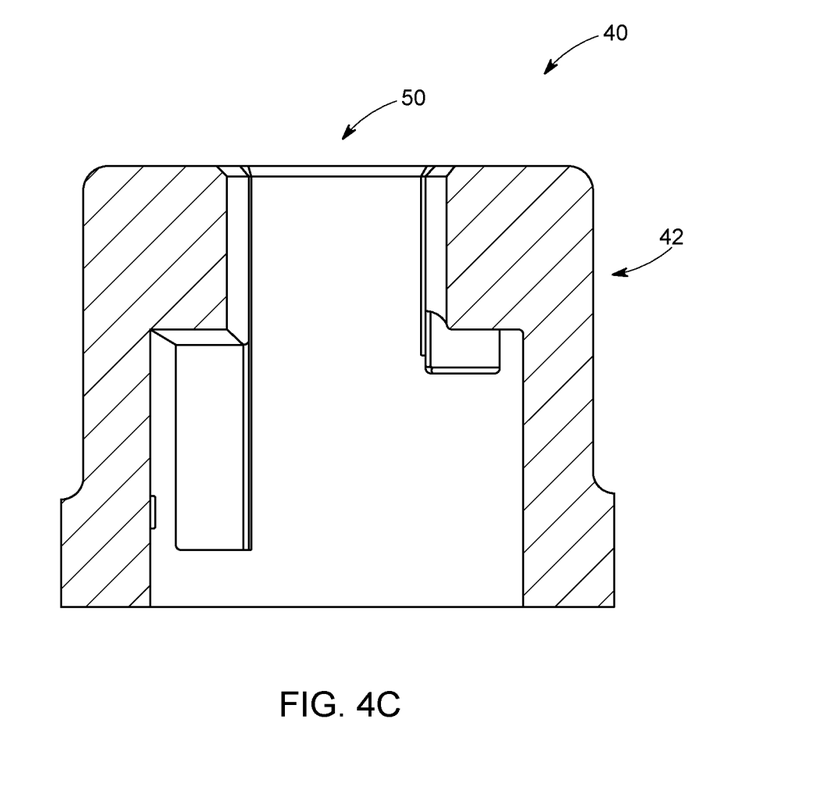
FIG. 4C is a cross-sectional view of the base portion of FIG. 4A taken generally along line 4C-4C in FIG. 4A.

Referring back to FIG. 2, the base portion 40 is configured to receive the eye bolt 12 therein. The collar 42 of the base portion 40 forms a first aperture 50 therein. The first aperture 50 is configured to receive the eye bolt 12. Referring to FIG. 4A, the base portion 40 is shown in a top view thereof. FIGS. 4B and 4C show respective cross-sectional views of the base portion 40 taken along lines 4B-4B and 4C-4C in FIG. 4A.

Referring back to FIG. 2, the collar 42 is secured to the platform 44. The platform 44 forms an aperture therein, which will be discussed in detail below. The spring 46 is located at least partially within the second aperture 74 (see FIG. 5) of the platform 44. The first aperture 50 and the second aperture 74 of the platform 44 are in spaced communication with each other. In other words, at least a portion of the first aperture 50 of the collar 42 and the second aperture 74 of the platform 44 are positioned such that the eye bolt 12 and the spring 46 work in conjunction with each other, as will be discussed in detail below. In one embodiment, the first aperture 50 of the collar 42 and the second aperture 74 formed in the platform 44 are generally aligned with each other.

A first end 46a of the spring 46 is attached to a first end 44a of the platform 44. The first end 44a of the platform 44 is on an opposing side of the collar 42. Specifically, in FIG. 2, the first end 46a of the spring 46 is attached to a cover bottom 60 in one embodiment. In such an embodiment, the cover bottom 60 is a separate piece and is attached to the platform 44 in the formed second aperture 74. In another embodiment, the spring may be attached to a bottom surface formed within the platform. In such an embodiment, the bottom surface assists in forming a portion of the aperture in the platform. In either embodiment, the cover bottom or the bottom surface of the platform is in a generally fixed position.

The base portion 40 of FIG. 2 includes a cover top 64. The cover top 64 is attached at a second end 46b of the spring 46. The cover top 64 in this embodiment assists in distributing the weight from the eye bolt assembly 10 more evenly across its surface. It is contemplated that the spring may directly contact the eye bolt assembly in another embodiment. More specifically, the spring may directly contact the second end of the stem portion of the eye bolt.

The eye bolt assemblies may comprise one or more materials. For example, the eye bolt assemblies comprise polymeric materials in one embodiment. Non-limiting examples of polymeric materials that may be used include polycarbonates and polyethylene terephthlates (PETs). It is contemplated that other polymeric materials may be used. In another example, the eye bolt assemblies comprise metallic materials. One non-limiting metallic material that may be used in forming the eye bolt assemblies is stainless steel. It is contemplated that other metallic materials may be used that include aluminum, zinc, titanium, and alloys of the same. It is contemplated that other metallic materials may be used.

Referring to FIGS. 5-8, the eye bolt assembly 10 is shown in various positions in the process of being securely locked. Specifically, FIGS. 5-8 show the eye bolt 12 being inserted and eventually securely locked in the base portion.

Figure 5:
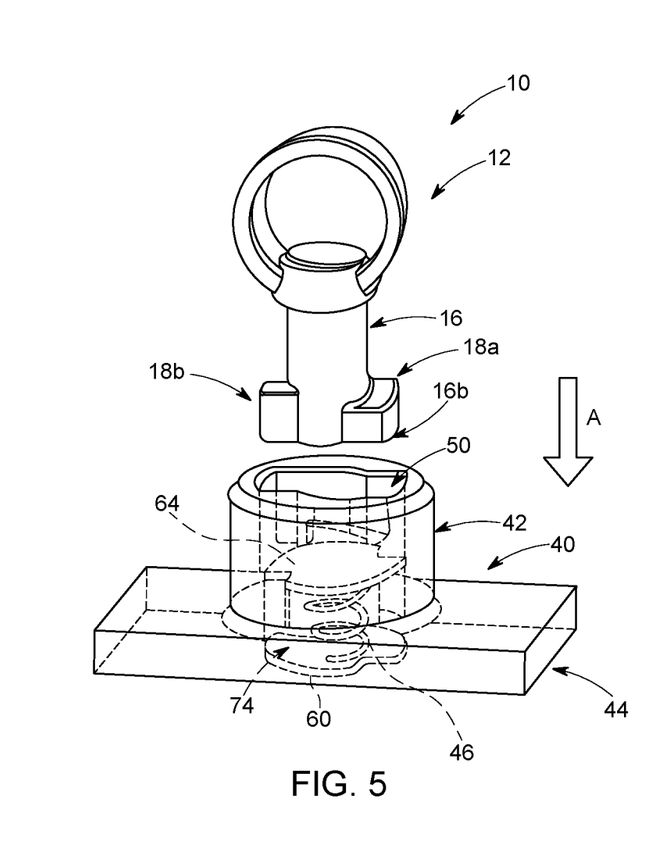
FIG. 5 is a side perspective view of an eye bolt during a process of being inserted into a base portion, in accordance with one method of the present disclosure.

Referring initially to FIG. 5, the eye bolt 12 is in the process of moving or sliding in a generally downward direction (in the direction of arrow A) into the first aperture 50 formed in the collar 42 of the base portion 40. The first aperture 50 is configured to receive the second end 16b of the stem portion 16 of the eye bolt 12. More specifically, the first aperture 50 is configured to receive the second end 16b of the stem portion 16 that includes the pair of winged extensions 18a, 18b. The spring 46 is shown in an extended position in FIG. 5. FIG. 5 also shows the first aperture 50 being generally aligned with the second aperture 74 formed in the platform 44. The cover bottom 60 of FIG. 5 is shown forming a portion of the second aperture 74 in the platform 44. A portion of the spring 46 is shown in the second aperture 74.

Figure 6:
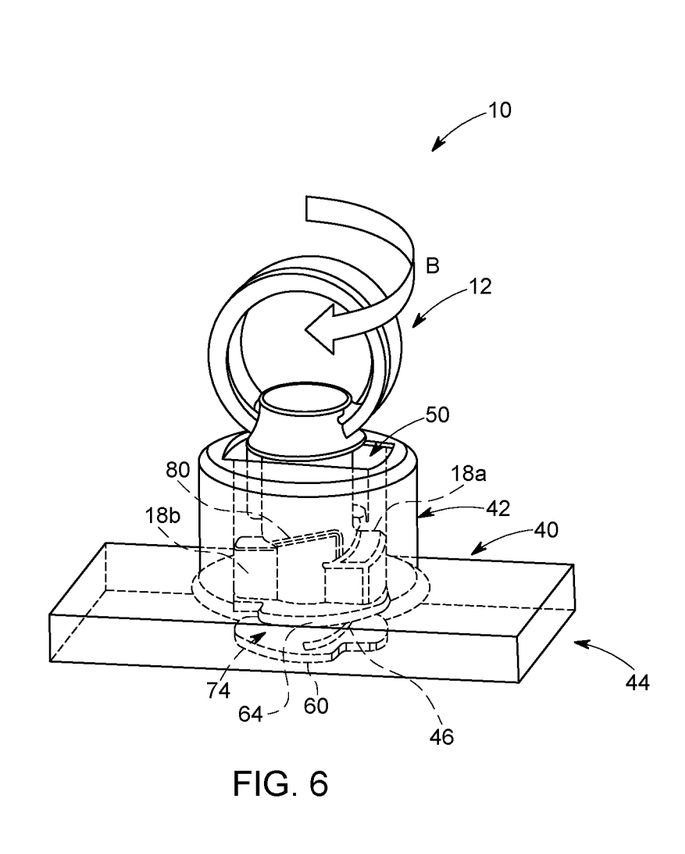
FIG. 6 is a side perspective view of the eye bolt after being initially inserted into the base portion, in accordance with one method of the present disclosure.

Referring next to FIG. 6, as the eye bolt is moved in the generally downward direction (arrow A as shown in FIG. 5), the spring 46 is compressed. The eye bolt 12 in this position has finished moving in the downward direction, and is now ready to be rotated in a clockwise direction (arrow B) of FIG. 6. In this embodiment, the eye bolt 12 is rotated about 90 degrees. It is contemplated that the eye bolt may be designed to rotate from about 30 degrees to about 150 degrees.

Figure 7:
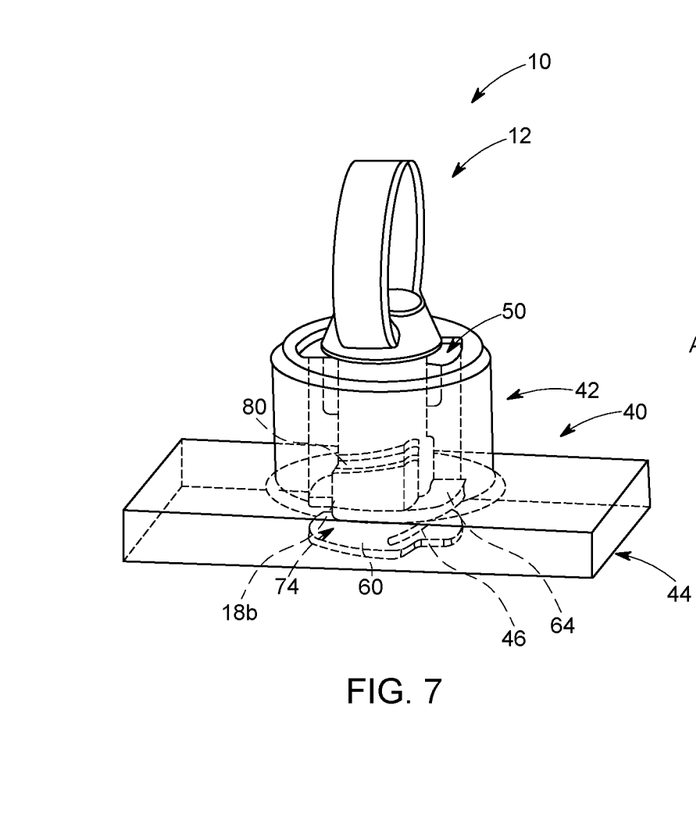
FIG. 7 is a side perspective view of the eye bolt after being rotated with respect to the base portion and just before being moved to the locked position, in accordance with one method of the present disclosure.
Figure 8:
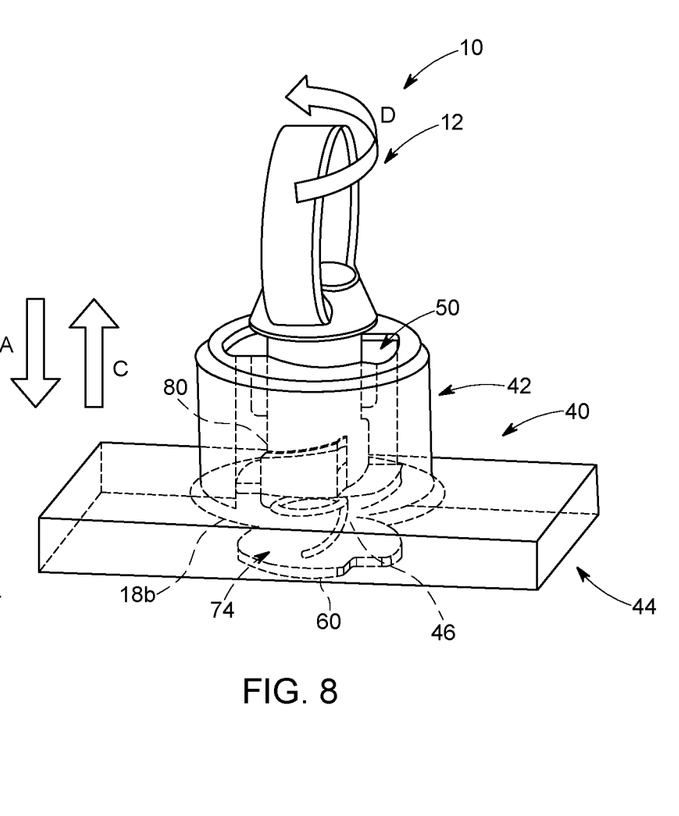
FIG. 8 is a side perspective view of the eye bolt after being rotated with respect to the base portion into the locked position, in accordance with one method of the present disclosure.

The location of the eye bolt after the eye bolt 12 has been rotated in the clockwise direction relative to the base portion 40 is depicted in FIG. 7. At this point in the time, a downward pressure is still being exerted on the eye bolt 12, resulting in the spring 46 being in a fully compressed position. After the downward pressure is released from the eye bolt 12, the spring 46 is released and extends generally upwardly as shown in FIG. 8. The spring 46 causes the eye bolt 12 to move generally upward. This movement of the spring 46 and eye bolt 12 is shown with respect to arrow C in FIG. 8.

The spring 46 in FIG. 8 is in a partially extended position. The spring 46 cannot move the eye bolt 12 any further upwardly (direction of arrow C) because the internal sidewalls of the collar 42 extend inwardly, which prevents or inhibits the eye bolt 12 from continuing in the direction of arrow C. More specifically, each of the internal sidewalls of the collar 42 are configured and designed to catch and securely lock the pair of winged extensions 18*a*, 18*b*. One of the internal sidewalls 80 is best shown in FIGS. 6 and 7, while the other internal sidewall is located on the opposing side and is not visible in FIGS. 6 and 7. The other internal sidewall is sized and shaped the same as the internal sidewall 80. The shape of the internal sidewalls in one embodiment corresponds to the respective exterior surface of the winged extensions 18*a*, 18*b* that contact the individual internal sidewall.

It is contemplated that the internal sidewalls may be shaped, sized or located differently than depicted. In another embodiment, the at least one internal sidewall may be of a continuous nature that assists in securing the at least one hinged extension.

The spring 46 maintains a pressure on the pair of winged extensions 18*a*, 18*b* in an upwardly direction (arrow C) such that they will not proceed back downwardly (direction of arrow A). During the process of moving the structures, the weight or load of the structures pulls the eye bolt 12 in the direction of arrow C, which further assists in maintaining the eye bolt assembly 10 in a locked position.

The process of unlocking the eye bolt 12 from the base portion 40 can occur in one method by doing the reverse of the steps described in FIGS. 5-8. Specifically, the position of the eye bolt 12 in FIG. 8 would be moved generally downwardly (in the direction of arrow A) and then rotated in the counterclockwise direction (arrow D). After rotating in the counterclockwise direction, the downward pressure would be released and the spring 46 would return to its fully extended position of FIG. 5.

Figure 9A:
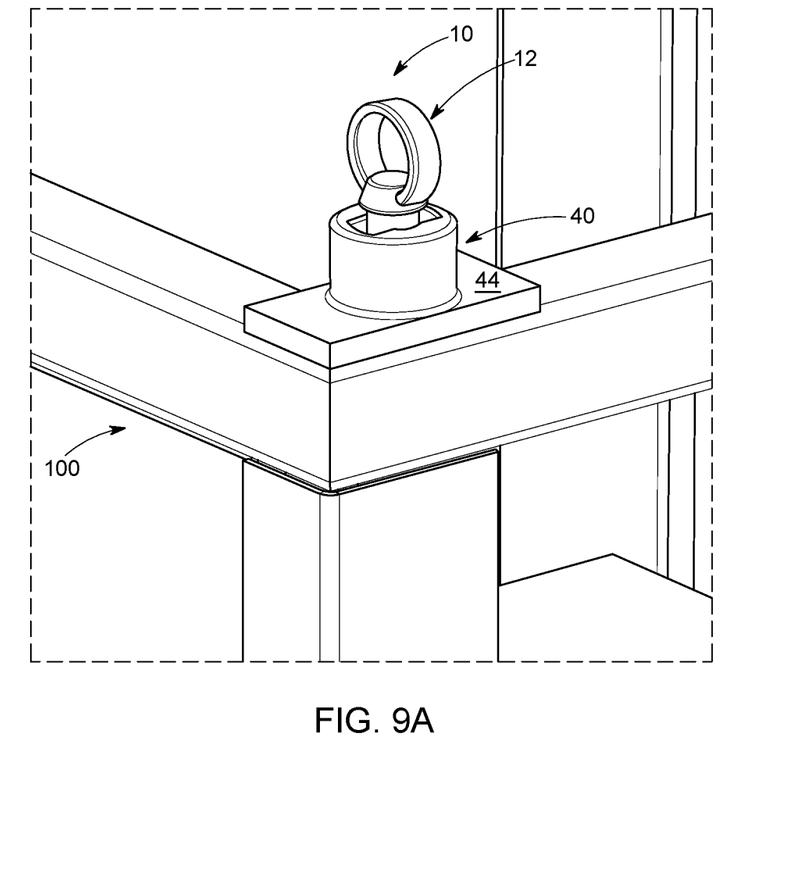
FIG. 9A is a top perspective view of the eye bolt assembly of FIG. 1 being attached to a structure, in accordance with one method of the present disclosure.

Referring to FIG. 9A, the eye bolt assembly 10, including the eye bolt 12 and the base portion 40, is shown secured to a structure 100. The eye bolt assembly 10 in one embodiment may be welded to the structure 100. More specifically, the platform 44 of the base portion 40 is welded to the structure 100 in this embodiment.

Figure 9B:
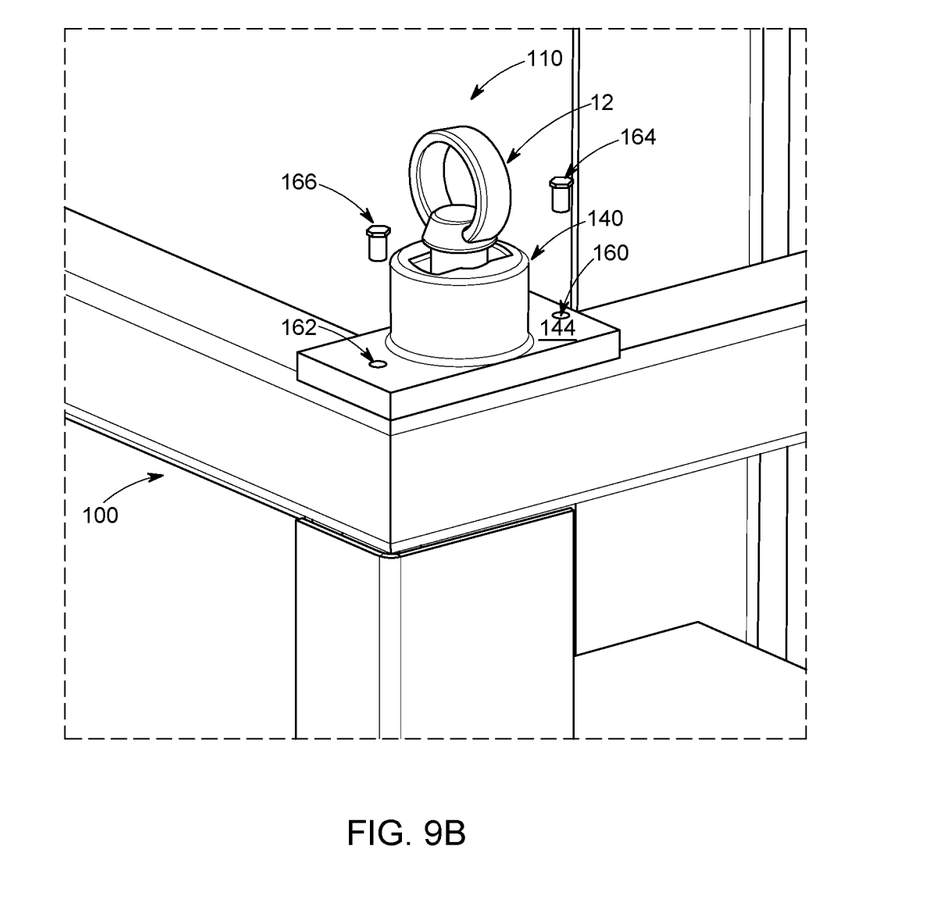
FIG. 9B is a top perspective view of an eye bolt assembly according to another embodiment being attached to a structure, in accordance with another method of the present disclosure.

Referring to FIG. 9B, an eye bolt assembly 110 is shown secured to the structure 100 via fasteners. The eye bolt assembly 110 includes the eye bolt 12 and a base portion 140. The eye bolt assembly 110 is identical to the eye bolt assembly 10 described above, except that the base portion 140 includes a platform 144 that forms a plurality of fastener-receiving apertures 160, 162. Each of the plurality of fastener-receiving apertures 160, 162 receives a fastener 164, 166. The fasteners 164, 166 assist in securing the eye bolt assembly 110 to the structure 100. The fasteners may be, for example, fasteners or bolts. It is contemplated that the eye bolt assembly may be secured in other manners to the structure other than depicted in FIGS. 9A, 9B.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. An eye-bolt assembly comprising:
    an eye bolt including a ring portion, a stem portion, and at least one winged extension, the stem portion including a first end and a second end, the ring portion being attached to the first end of the stem portion, the at least one winged extension being attached to the second end of the stem portion; and
    a base portion configured to receive and securely lock the eye bolt therein, the base portion including a collar and a platform secured to the collar, the collar extending from and being integrally connected to the platform, the collar forming a first aperture therein, the platform forming a second aperture therein, the platform including a spring being located at least partially within the second aperture of the platform, the spring including a first end and a second end, the first end of the spring being attached to and directly contacting the platform, the second aperture formed in the platform being in spaced communication with the first aperture formed in the collar,
    wherein the ring portion of the eye bolt does not extend into the first aperture or the second aperture in the locked position.

2. The eye bolt assembly of claim 1, wherein the ring portion is generally circular shaped.

3. The eye bolt assembly of claim 1, wherein the stem portion includes a shoulder, the shoulder being attached to the ring portion.

4. The eye bolt assembly of claim 3, wherein the shoulder has a top surface and a bottom surface, the shoulder being angled outwardly from the top surface to the bottom surface.

5. The eye bolt assembly of claim 3, wherein the shoulder is secured into the base portion in a locked position.

6. The eye bolt assembly of claim 1, wherein the at least one winged extension is a plurality of winged extensions.

7. The eye bolt assembly of claim 1 further including a cover top, the cover top being attached to the second end of the spring.

8. The eye bolt assembly of claim 1, wherein the platform includes a cover bottom, the cover bottom being attached to and directly contacting the first end of the spring.

9. The eye bolt assembly of claim 1, wherein the collar forms an internal shoulder, the internal shoulder assisting in locking the eye bolt assembly by receiving the at least winged extension.

10. The eye bolt assembly of claim 1, wherein the second aperture formed in the platform is generally aligned with the first aperture formed in the collar.

11. The eye bolt assembly of claim 1, wherein the eye bolt assembly comprises a metallic material.

12. The eye bolt assembly of claim 11, wherein the eye bolt assembly comprises stainless steel.

13. The eye bolt assembly of claim 11, wherein the eye bolt assembly comprises aluminum, zinc, titanium, and alloys of the same.

14. The eye bolt assembly of claim 1, wherein the eye bolt assembly comprises a polymeric material.

15. The eye bolt assembly of claim 14, wherein the eye bolt assembly comprises polycarbonates or polyethylene terephthlates.

\* \* \* \* \*